United States Patent [19]
Kawasaki

[11] 3,868,701
[45] Feb. 25, 1975

[54] AUTOMATIC FLASH CONTROL SYSTEM FOR CAMERAS

[75] Inventor: Masahiro Kawasaki, Tokyo, Japan

[73] Assignee: Asahi Kogaku Kogyo Kabushiki Kaisha, Tokyo-to, Japan

[22] Filed: Sept. 19, 1973

[21] Appl. No.: 398,808

[30] Foreign Application Priority Data
Sept. 22, 1972  Japan.............................. 47-95276

[52] U.S. Cl..................... 354/33, 315/151, 354/60, 354/149
[51] Int. Cl......................... G03b 7/08, G03b 15/05
[58] Field of Search ........... 95/10 C, 10 CE, 10 CT; 315/149, 151, 155; 354/33, 29, 32, 60, 149

[56] References Cited
UNITED STATES PATENTS
3,709,123  1/1973  Tokutomi ......................... 95/10 CE
3,714,443  1/1973  Ogawa ............................. 315/151 X Primary Examiner—Joseph F. Peters, Jr.
Attorney, Agent, or Firm—Steinberg & Blake

[57] ABSTRACT

An automatic control system for flash illumination in a camera which operates with a preparatory flash and then, during the film exposure, with a main flash. The camera has an internal light-receiving element which receives the light during the preparatory flash illumination and determines when a preset amount of light is internally received. An external light receiving element is situated with respect to the flash source to receive reflected flash illumination during the preparatory flash operation. A suitable preparatory electrical circuit receives this latter amount of illumination and integrates it during the preparatory flash operation. The integration terminates when the internal light-receiving element has received the preset amount of light. The integrated value at the time the preparatory electrical circuit stops integrating is retained for subsequent use during the main flash illumination to determine the amount of main flash illumination needed for proper exposure control.

12 Claims, 5 Drawing Figures

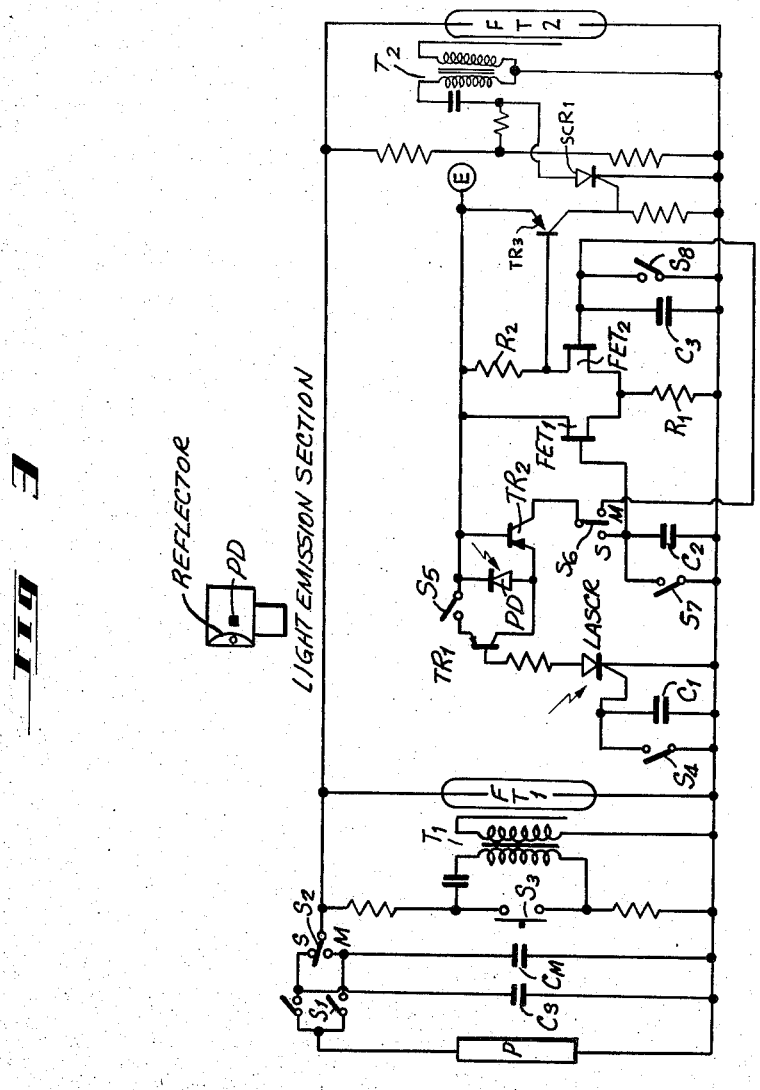

AUTOMATIC FLASH CONTROL SYSTEM FOR CAMERAS

BACKGROUND OF THE INVENTION

The present invention relates to cameras.

In particular, the present invention relates to automatic flash control systems for cameras.

In utilizing cameras such as the single lens reflex camera in conjunction with flash illumination, the light from the flash is usually measured internally after the light has travelled through the objective of the camera. However, because of the structure of the camera, the light cannot be internally measured during the actual exposure of the film. As a result, it is known to use a preparatory flash illumination prior to the main flash illumination. By measuring the light during the preparatory flash illumination a proper determination can be made to control the main flash illumination to achieve exposure control. In using a preparatory flash illumination, it has already been proposed that the preparatory flash amount of light bear a proportionate relationship with the main flash amount of light. A light receiving element measures when the amount of preliminary illumination proportionate to the main illumination has been emitted. A flash terminating control circuit then acts upon the light emitting element to terminate the preparatory flash operation. The amount of preparatory flash illumination is memorized and subsequently utilized to determine the amount of main flash illumination needed to achieve exposure control.

However, in systems of this type the light receiving element will receive not only the amount of preparatory light illumination which is needed to achieve the proper exposure, but also an additional amount of light during the quenching time subsequent to the flash terminating signal. Thus, the preparatory flash amount which is memorized includes both the proper flash amount plus an error developed during the quenching time. When the main flash is subsequently controlled by proportionately multiplying the memorized amount of preliminary flash, both the proper amount plus the error amount will be multiplied so as to unavoidably include an error which is magnified by the multiplication amount.

SUMMARY OF THE INVENTION

It is accordingly a primary object of the present invention to provide a system which will avoid the above-mentioned problems of the prior art.

In particular, it is an object of the present invention to provide a system which enables a signal corresponding only to the proper amount of preliminary flash illumination to be memorized, without memorizing the error resulting during the quenching time of the flash source.

Thus, it is an object of the present invention to provide a system which will provide a main flash illumination which is based upon a proper amount of preparatory flash illumination and does not include the amount of flash illumination present during the quenching of the flash source.

It is therefore an object of the present invention to provide a system of the above type which is far more accurate than previously known similar systems.

At the same time, it is an object of the invention to provide a system which is simpler in its construction and more reliable in its operation than previously known systems.

According to the invention, the camera has a flash means capable of carrying out first a preparatory flash illumination and then a subsequent, main flash illumination. An internal light-receiving means is situated within the camera for receiving light which has travelled through the objective thereof during the preparatory flash operation of the flash means and for determining when a preset amount of light is internally received. An external light-receiving means is situated with respect to the flash means to receive flash illumination reflected from the object to be photographed. A preparatory electrical circuit means is electrically connected with the external light-receiving means and responds to the internal light-receiving means. The preparatory electrical circuit means integrates the amount of illumination received by the external light-receiving means during the preparatory flash operation and terminates the integration in response to a signal produced when the internal light-receiving means has received a preset amount of light. The amount of light integrated at the time of the termination of integration is retained for subsequent use during the main flash illumination to determine the amount of main flash illumination needed to achieve the proper exposure.

BRIEF DESCRIPTION OF DRAWINGS

The invention is illustrated by way of example in the accompanying drawings which form part of this application and in which:

FIG. 3 is a wiring diagram of one possible system according to the invention.

DESCRIPTION OF PREFERRED EMBODIMENTS

Figure 1:
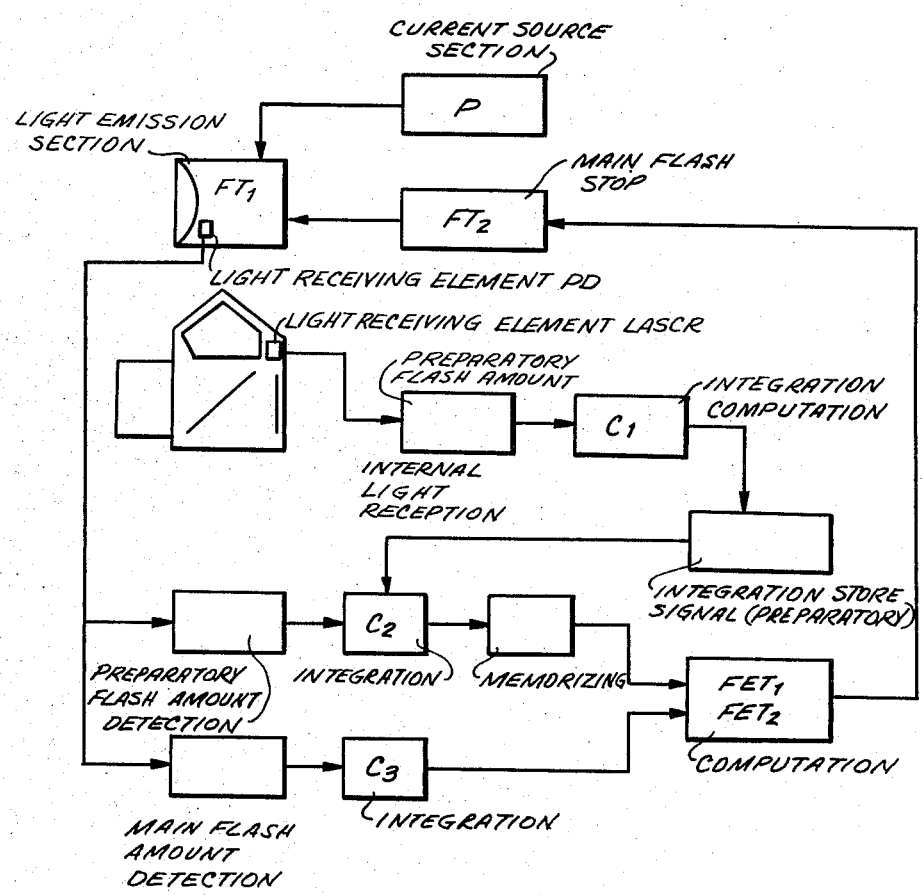
FIG. 1 is a schematic block diagram illustrating the principle of operation of the system of the invention.

Referring first to FIG. 1, the principle of operation of the present invention is schematically illustrated therein. Thus, it will be seen that at the top of FIG. 1 there is an indication of a current source section P which provides the energy to be utilized during the main flash operation and the preparatory flash operation. This source of current supplies energy to a light emission section $FT_1$ which serves as the flash means. An external light receiving element PD is situated at a location which is adjacent to the light emission section $FT_1$ so as to receive light reflected from the object receiving the illumination emitted by the light emission section $FT_1$. Situated just below the light emission section is the schematically illustrated single lens reflex camera which has the schematically illustrated objective through which light enters to be reflected upwardly by the inclined mirror and, after travelling through the viewfinder prism, this light is received by an internal photosensitive means or light-receiving element LASCR which, through the circuitry designated by the block "preparatory flash amount internal light reception," causes an integration computation section $C_1$ to provide an integration of the preparatory light received. The quantity integrated is stored as shown by the integration store signal block.

A preparatory flash amount detection circuit is electrically connected to the external photosensitive means or light receiving element PD which causes an integration circuit $C_2$ to integrate the amount of light detected by photosensitive means PD. Thus, the internal light receiving element LASCR and the circuitry connected thereto provide an integrated value of the internal light received from the preparatory flash illumination, while the external light receiving element PD and the circuitry connected thereto provide an integrated value of the external light reflected by the object to be photographed. When the integrated value of the external light reception circuitry reaches a predetermined value, a signal is sent from the integration store signal section to the integration section $C_2$ of the external light receiving circuitry terminating further integration. The integrated value in the integration section $C_2$ at the time of termination is then memorized by the circuitry designated by the memorizing section block. Thus, the preparatory flash operation can continue although the amount memorized by the memorizing section will not change any further once the internal light receiving circuitry receives the predetermined value of light. It is noted that the terminating signal during the preparatory flash operation is not sent to the light emission section FT to stop further preparatory flash operation but rather to the integration circuit $C_2$ which integrates the external light received by the light receiving element PD.

The predetermined value set on the internal light reception circuitry is generally a fixed amount related to the light required for proper exposure during a subsequent main flash operation. While the comparison value is a constant, the amount of light emitted to achieve this proper exposure time will vary based on photographic conditions such as the diaphragm value, the object distance, the speed of film utilized, etc. The predetermined comparison value of preliminary light to be internally received bears a constant proportional relationship with the amount of main flash illumination needed for proper exposure. Thus, once the constant predetermined comparison value of preliminary light is received internally and the amount of light emitted from the light emission section $FT_1$ is memorized to achieve this predetermined amount of internal light, it is possible to then determine the amount of main flash illumination which should be emitted from the light emission section to achieve the proper exposure time.

Subsequent to the preparatory flash operation, the actual exposure will be made while the main flash operation is carried out, and at the same time the inclined mirror is in an upper position permitting the film to be exposed, so that the light cannot be received at this time by the internal light receiving element LASCR. The external light receiving element PD, however, does receive the illumination which is reflected from the object to be photographed after emission by the light emission section $FT_1$ during the main flash operation. The light externally received by PD during main flash is detected by the main flash amount detection circuitry (lower left block of FIG. 1) with integration by the integration circuit $C_3$. The integrated amount of main flash illumination is compared with the memorized value of the preparatory flash illumination in the computation section $FET_1$, $FET_2$ and when the integrated amount of main flash illumination has a predetermined proportional relationship with the memorized amount of preparatory flash illumination a signal is automatically transmitted to the main flash stop section $FT_2$ in order to actuate the latter so as to terminate automatically the light emission section $FT_1$ thus ending the main flash operation.

Figure 2A:
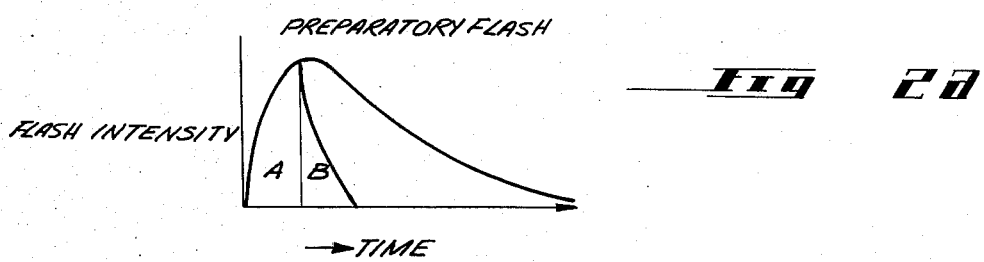
FIG. 2a–2c represent graphs explaining the operation of the present invention.
Figure 2B:
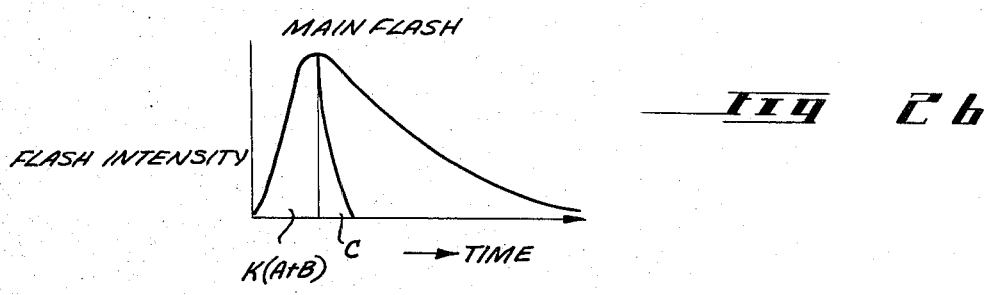
Figure 2C:
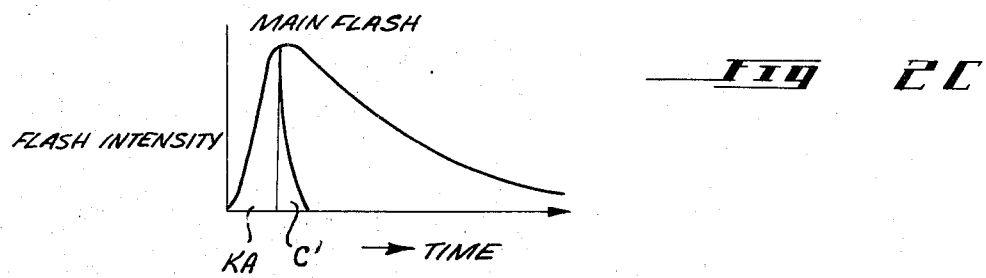

In order to illustrate the operation of the invention graphically, reference will be made to FIGS. 2a–2c. In known cameras utilizing a preparatory flash, during the preparatory flash operation flash illumination intensity will be continuously measured until a proper flash amount designated by A in FIG. 2a is measured. At that time the flash means is terminated. However, during the quenching time of the flash means a further amount of light will be received as designated by area B. Thus, the preparatory flash illumination intensity which is memorized for subsequent use during the main flash illumination is A plus B. The main flash illumination amount has a certain proportional relationship K to the preparatory flash illumination amount and the main flash is controlled to produce an amount which is K times the amount of preparatory flash illumination memorized or $K(A + B)$. In addition, the amount of light emitted during quenching time of the main flash illumination designated in FIG. 2b by area C, should be considered so that the total error in main flash illumination is equal $KB + C$. While the error amount C results during the main flash operation, the amount KB results from the error during the preparatory flash illumination.

According to the present invention, only the proper amount of preparatory flash A will be memorized whereby during the main flash illumination the amount of main flash will be K times the amount of preparatory flash plus the error introduced during the main flash illumination resulting from the quenching time. Thus, the amount of flash intensity during the main flash illumination will be $KA + C'$ as is shown in FIG. 2c. It is noted, that the error KB resulting during the preparatory flash operation has been entirely eliminated from the main flash illumination.

The above is achieved by internally measuring the preparatory flash illumination received and at the same time externally measuring the preparatory flash being emitted. When the internal light measuring means receives the preset amount of preparatory flash illumination, it stops further integration of the external light and memorizes the value thusfar integrated. The external light integrated is therefore memorized prior to the actual quenching of the light emitting element during the preparatory flash operation. In fact, the preparatory flash operation need not be terminated but may continue until the end of its operation time since no further preparatory emitted light will be memorized. As a result, the amount which is memorized represents A, the proper flash amount, and during subsequent main flash illumination the controlled amount of main flash will be KA representing a proportionate relationship to the preparatory flash light memorized.

Referring now to FIG. 3 there is shown a wiring diagram of one possible system according to the invention. A high voltage DC source P is used to charge up a main flash capacitor $C_M$ and a preparatory flash capacitor $C_S$ when a preparatory-main current source disconnection switch $S_1$ is closed. A flash tube $FT_1$ is placed in parallel across the capacitors $C_M$ and $C_S$ and can be interconnected with either one of them by means of the preparatory-main capacitor changeover switch $S_2$ such that when the switch $S_2$ is in position M the flash tube $FT_1$ is energized by capacitor $C_M$ and when switch $S_2$ is in position S the flash tube $FT_1$ is energized by means of capacitor $C_S$. The flash tube $FT_1$ is triggered by means of the secondary of transformer $T_1$ whose primary is connected by means of a capacitor across a switch $S_3$. The ends of the switch $S_3$ are connected respectively across the ends of the flash tube $FT_1$ through series resistors.

The control circuitry is energized by a low-voltage DC source E, as schematically indicated, with a suitable illustrated switch in series therewith. This circuitry includes a light responsive element or internal photosensitive means represented by a light activated silicon controlled rectifier (LASCR) positioned internally of the camera so as to be able to internally measure the light reflected by the object to be photographed owing to the preparatory flash. An integration capacitor $C_1$ is connected to the gate of the LASCR with an integration reset switch $S_4$ in parallel with the integration capacitor $C_1$. The base of transistor $TR_1$ is connected through a series resistor to the anode of the LASCR. A flash amount detecting photo diode PD which is located externally of the camera, and forms the external photosensitive means is placed across the collector-emitter terminals of transistor $TR_1$ through a reset switch $S_5$. A common-base transistor $TR_2$ is connected in parallel across the photo diode PD with the collector thereof connected to a preparatory-main flash amount integration changeover switch $S_6$, such that when switch $S_6$ is in position S it is connected to an integration capacitor $C_2$, which has an integration reset switch $S_7$ in parallel therewith, and when changeover switch $S_6$ is in position M it is connected to integration capacitor $C_3$, which has integration reset switch $S_8$ in parallel therewith. The capacitors $C_2$ and $C_3$ are respectively connected to the gates of a differential amplifier consisting of field effect transistors $FET_1$ and $FET_2$. The differential amplifier includes appropriate biasing resistors $R_1$ and $R_2$. The output section of field effect transistor $FET_2$ is connected to the base of transistor $TR_3$ whose collector is coupled to the gate of a silicon controlled transistor $SCR_1$ whose anode is connected in series with the primary of a transformer $T_2$ through appropriate resistors and capacitors. A flash stop tube $FT_2$ is triggered by means of the secondary of the transformer $T_2$. The flash stop or quenching tube $FT_2$ is connected in parallel with the flash tube $FT_1$.

The time sequence of the operation of the switches is as follows. Initially, the switch $S_1$ is in a closed position thereby charging the capacitors $C_S$ and $C_M$ from the DC high voltage source P. Shortly before the preparatory flash illumination the switch $S_1$ is opened, the switch $S_2$ is closed to the S side, the switch $S_3$ is opened, the switches $S_4$, $S_5$, $S_7$ and $S_8$ are closed and switch $S_6$ is closed onto the S side. The preparatory flash is commenced by the closing of switch $S_3$ and at the same time the switches $S_4$ and $S_7$ are opened. Immediately after completion of the preparatory flash, the switches $S_2$ and $S_6$ are changed over to the M position and the switches $S_3$ and $S_5$ are opened. The system is then ready for the main flash illumination which is commenced by the closing of the switch $S_3$ and at the same time the switch $S_8$ is opened.

The operation of the circuit shown in FIG. 3 is as follows:

After the capacitors $C_S$ and $C_M$ have been charged with the switch $S_1$ in the closed position, the switch $S_1$ is opened and with the switch $S_2$ in the S position the preparatory flash operation can commence. Closure of the switch $S_3$ causes the flash tube $FT_1$ to emit the preparatory flash as a result of the charge on capacitor $C_S$ passing through the flash tube $FT_1$ which has been triggered by means of the secondary of the transformer $T_1$. The photo diode PD receives light and causes the amount of light received to be integrated by means of the capacitor $C_2$ through the common base transistor $TR_2$. It will be remembered that the switch $S_6$ is in the S position during the preparatory flash operation and the switch $S_7$ is open. The light responsive element LASCR located internally of the camera receives the light which passes through the objective and causes the light amount received to be integrated through the capacitor $C_1$. When the integration voltage stored by the capacitor $C_1$ reaches the gate trigger value of the LASCR, the LASCR becomes conductive so that the transistor $TR_1$ will be turned on and with the switch $S_5$ in the closed position the photo current produced by the photo diode PD will no longer pass through the transistor $TR_2$ but will instead pass through $TR_1$. As a result, the light amount integration at the capacitor $C_2$ is stopped, and the integration voltage value at this time is memorized by the capacitor $C_2$ as the preparatory flash value.

If the capacitor $C_1$ and the gate trigger voltage of the LASCR is so determined that the point where the integration amount on the capacitor $C_1$ reaches the gate trigger voltage of the LASCR corresponds to the proper amount of preparatory flash which is to be received internally of the camera, then the memorized integration value at the capacitor $C_2$ corresponds to the proper flash amount of preparatory flash for subsequent proper exposure. Even if the flash tube $FT_1$ continues emitting preparatory flash illumination which will be received by the photo diode PD, this illumination will no longer be memorized by the capacitor $C_2$. The amount memorized by $C_2$ will remain fixed at the integration value achieved when the integration was stopped when the LASCR began conducting.

After the preparatory flash operation has concluded, the switches will be changed for the main flash operation. The switch $S_2$ will now be in the M position whereby, upon closing the switch $S_3$ through the X contact of the camera, the flash tube $FT_1$ will emit light resulting from the charge stored by the capacitor $C_M$. The photo diode PD located adjacent to the flash tube $FT_1$ receives the reflected main flash illumination and the resulting photo current causes light integration to be made at the capacitor $C_3$ through the transistor $TR_2$. It will be remembered that the switch $S_6$ is now in position M the switch $S_6$ is open and the switch $S_5$ is also open. By means of the differential amplifier, consisting of the field effect transistor $FET_1$ and $FET_2$, when the integration value on the capacitor $C_3$ becomes equal to an amount having a proportional relationship with the memorized value on the capacitor $C_2$, the transistor $TR_3$ becomes conductive. The silicone controlled rectifier $SCR_1$ is thereby turned on to energize transformer $T_2$ thereby triggering the flash stop tube $FT_2$ to discharge thereby stopping the main flash illumination from $FT_1$. As a result, in the main flash operation a more accurate amount of main flash is obtained since the main flash amount will be based upon the proper preparatory flash amount and the error introduced by the quenching time of the preparatory flash operation will be eliminated. In addition, since quenching of the flash tube is not made twice but only once namely during the main flash illumination operation, the flash stop tube $FT_2$ is utilized less so that the life and stability thereof can be improved.

What is claimed is:

1. In a camera having an objective, flash means having a preparatory flash operation prior to a main flash operation for providing a given amount of preparatory flash illumination during said preparatory flash operation, internal photosensitive means situated within the camera for receiving light which has travelled through the objective during the preparatory flash operation and for determining when a predetermined amount of light is internally received, external photosensitive means situated with respect to said flash means for receiving light during said preparatory flash operation, and preparatory electrical circuit means electrically connected with said external means and said internal means for integrating the amount of light received by said external means during said preparatory flash operation, said internal means terminating the integration of said preparatory electrical circuit means without terminating the preparatory flash illumination from said flash means when said predetermined amount of light is received by said internal means, the integrated value achieved at the termination of integration being retained for subsequent use during the main flash illumination.

2. The combination of claim 1 and wherein said flash means provides a main flash illumination during said main flash operation, said external means receiving light during said main flash operation, the combination further comprising, flash terminating means electrically connected with said flash means for automatically terminating the main flash operation thereof, and main electrical circuit means electrically connected with said external means and said flash terminating means for integrating the amount of light received by said external means during the main flash operation and controlling said flash terminating means when said last integrated value has a predetermined proportionate relationship to the retained integrated value.

3. The combination of claim 2 and wherein said main electrical circuit means includes integration circuit means for integrating an electrical quantity from said external photosensitive means and computation means electrically connected between said integration circuit means and said preparatory electrical circuit means for comparing the integrated electrical quantity with the retained integrated value.

4. The combination of claim 3 and wherein said integration circuit means includes a first capacitor means and wherein said preparatory electrical circuit means includes second capacitor means for retaining the integrated value, and wherein the predetermined proportionate relationship is represented by the ratio of the first capacitor to the second capacitor.

5. The combination of claim 1 and wherein said internal photosensitive means receives light for converting the received light into a corresponding electrical quantity, integration circuit means for integrating said electrical quantity and control circuit means responsive to the integrated electrical quantity for producing an output signal when the integrated electrical quantity reaches a predetermined value.

6. The combination of claim 1 and wherein said external photosensitive means receives light for converting the received light into a corresponding electrical quantity and wherein said preparatory electrical circuit means includes integration circuit means for integrating the electrical quantity from said external photosensitive means and memorizing means for retaining the integrated electrical quantity.

7. The combination of claim 1 and wherein said internal means includes a light activated silicon controlled rectifier, a first preparatory integration capacitor electrically connected to a gate of said light activated silicon controlled rectifier and causing said light activated silicon controlled rectifier to conduct when a predetermined amount of integration voltage is reached, and first transistor means electrically connected to said light activated silicon controlled rectifier to conduct when said light activated silicon controlled rectifier conducts.

8. In a camera having an objective, flash means having a preparatory flash operation prior to a main flash operation for providing a preparatory flash illumination during said preparatory flash operation, internal photosensitive means situated within the camera for receiving light which has travelled through the objective during the preparatory flash operation and for determining when a predetermined amount of light is internally received, external photosensitive means situated with respect to said flash means for receiving light during said preparatory flash operation, and preparatory electrical circuit means electrically connected with said external means and said internal means for integrating the amount of light received by said external means during said preparatory flash operation and for terminating the integration when said predetermined amount of light is received by said internal means, the integrated value achieved at the termination of integration being retained for subsequent use during the main flash illumination, and wherein said internal means includes a light activated silicon controlled rectifier, a first preparatory integration capacitor electrically connected to a gate of said light activated silicon controlled rectifier and causing said light activated silicon controlled rectifier to conduct when a predetermined amount of integration voltage is reached, and first switching circuit means electrically connected to said light activated silicon controlled rectifier to conduct when said light activated silicon controlled rectifier conducts, and wherein said external means includes an external photosensitive diode located in parallel with said first switching circuit means, and wherein said preparatory electrical circuit means comprises the combination of second switching circuit means electrically connected to said diode to conduct when said diode conducts, and second preparatory integration capacitor means electrically connected to said second switching circuit means for providing an integration voltage corresponding to the light received by said diode, whereby when said first switching circuit means conducts, said second preparatory integration capacitor means terminates integration.

9. The combination of claim 8 and further comprising main electrical circuit means electrically connected with said external means and including third integration capacitor means, differential amplifier means, the voltage across said second preparatory integration capacitor means and the voltage across said third integration capacitor means being compared by said differential amplifier means, and flash terminating means electrically connected with the output of said differential amplifier means and providing in response to a comparison an output which terminates the flash means during the main flash operation.

10. In a camera, flash means for providing prior to film exposure a given total amount of preparatory flash illumination and for then providing main flash illumination during film exposure, photosensitive means for responding to said preparatory flash illumination and preparatory electrical circuit means electrically connected with said photosensitive means for achieving therefrom an electrical quantity corresponding to less than the total amount of preparatory flash illumination actually provided by said flash means for subsequently determining the duration of the main flash illumination required for proper exposure, flash terminating means electrically connected with said flash means for terminating the operation thereof during main flash illumination, and main electrical circuit means electrically connected between said preparatory electrical circuit means and said flash terminating means for automatically actuating the latter to terminate the operation of said flash means during main flash illumination in accordance with said electrical quantity.

11. The combination of claim 10 and wherein said flash terminating means is electrically connected only between said main electrical circuit means and said flash means for operating only during main flash illumination.

12. The combination of claim 10 and wherein said photosensitive means includes an external photosensitive unit used during both preparatory and main flash illumination and internal photosensitive unit situated in the camera and operating only during preparatory flash illumination.

* * * * *